US009941967B2

United States Patent
Welle et al.

(10) Patent No.: US 9,941,967 B2
(45) Date of Patent: Apr. 10, 2018

(54) SATELLITE LASER COMMUNICATIONS RELAY NETWORK

(71) Applicant: The Aerospace Corporation, El Segundo, CA (US)

(72) Inventors: Richard P. Welle, Sunset Beach, CA (US); Siegfried W. Janson, Redondo Beach, CA (US); Roger Yang, Rancho Palos Verdes, CA (US); John Serafini, Hingham, MA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 15/067,933

(22) Filed: Mar. 11, 2016

(65) Prior Publication Data

US 2016/0269116 A1    Sep. 15, 2016

Related U.S. Application Data

(60) Provisional application No. 62/131,683, filed on Mar. 11, 2015.

(51) Int. Cl.
*H04B 10/00* (2013.01)
*H04B 10/29* (2013.01)
(Continued)

(52) U.S. Cl.
CPC ......... *H04B 10/29* (2013.01); *H04B 7/18513* (2013.01); *H04W 84/06* (2013.01)

(58) Field of Classification Search
CPC .. H04B 10/29; H04B 7/18513; H04B 10/118; H04B 10/1121; H04B 10/22; H04B 7/185; H04W 84/06; F41G 7/2206
(Continued)

(56) References Cited

U.S. PATENT DOCUMENTS 5,999,797 A    12/1999   Zancho et al.
6,002,916 A *   12/1999   Lynch ................ H04B 7/18578
                                                                  455/12.1

(Continued)

FOREIGN PATENT DOCUMENTS

WO    WO 2014/121197    *   7/2014
WO    WO-2014121197 A2    8/2014

OTHER PUBLICATIONS

International Search Report and Written Opinion issued by the U.S. Patent and Trademark Office as Searching Authority in International Application No. PCT/US16/22041, dated Dec. 28, 2016 (9 pages).

Primary Examiner — M. R. Sedighian
(74) Attorney, Agent, or Firm — Wilmer Cutler Pickering Hale and Dorr LLP

(57) ABSTRACT

A system for reducing the cost and increasing the rate and reliability of data transmission from space to ground includes a network of relay satellites in low Earth orbit (LEO). Each relay satellite is configured to receive data from one or more client satellites, and configured to transmit data from LEO to ground using optical communications. The system may also include multiple optical ground stations configured to receive the data and transmit the received data using terrestrial networks to client locations. The network may provide an alternative to downlinking large amounts of data for new satellite operators without an existing ground network and for established satellite operators seeking higher data rates, lower latency, or reduced ground system operating costs.

8 Claims, 2 Drawing Sheets

(51) Int. Cl.
*H04B 7/185* (2006.01)
*H04W 84/06* (2009.01)

(58) Field of Classification Search
USPC .......................................... 398/125
See application file for complete search history.

(56) References Cited

U.S. PATENT DOCUMENTS

| | | |
|---|---|---|
| 6,208,625 B1 | 3/2001 | Zancho et al. |
| 6,553,226 B1 | 4/2003 | Watson |
| 6,909,896 B2 | 6/2005 | Laufer et al. |
| 2003/0137930 A1 | 7/2003 | Futernik |
| 2012/0184208 A1 | 7/2012 | Renouard et al. |
| 2014/0105100 A1 | 4/2014 | Tronc et al. |

* cited by examiner

SATELLITE LASER COMMUNICATIONS RELAY NETWORK

CROSS-REFERENCE TO RELATED APPLICATIONS

This application claims priority to U.S. Provisional Patent Application No. 62/131,683, filed Mar. 11, 2015, entitled "CubeSat Laser Communications Relay Network," which is hereby incorporated by reference in its entirety.

FIELD

The present invention relates to an application of a relay network, and in particular, a communications relay network.

BACKGROUND

Recent progress in sensor technology has allowed low Earth orbit (LEO) satellites to shrink significantly in size, disrupting a legacy industry where traditional satellites cost 500 million dollars to 1 billion dollars to build and launch. Major investments are being made to address the new opportunities that this provides for data collection, and many companies are launching nanosatellites and/or microsatellites into LEO to capture this opportunity. The rapidly expanding satellite infrastructure is generating vast amounts of data, reaching nearly 20 PB/year in 2014, with no signs that the trend will level off. To bring all that data down from LEO requires an average communication rate of 5 Gb/s, continuously, and that demand will continue to grow.

Typically, most satellites download data via space-to-ground radio-frequency (RF) links, communicating directly with fixed ground stations as the satellites fly within range. The current ground station infrastructure has several key limitations that present significant challenges as the satellite industry continues to grow. Satellite-to-ground communications are "line-of-sight," meaning that ground stations must receive data only from satellites that are directly above the local horizon. The duration of a satellite passes over a ground station depends on the altitude of the satellite and the distance between the ground station and the ground track of the satellite. With satellites in LEO, the maximum pass duration is typically less than ten minutes.

The frequency of passes is strongly dependent on the satellite orbit parameters and the location of the ground station. For example, a satellite in equatorial orbit will pass over an equatorial ground station on each orbit. This means that with a typical orbital period of 90 minutes, the satellite will pass the ground station 16 times per day. Similarly, a satellite in a polar orbit will pass over a ground station located at the North Pole once per orbit. On the other hand, the satellite in polar orbit will pass over the equatorial ground station between two and four times per day depending on the alignment of the ground track with the location of the ground station.

However, it should be noted that the satellite in equatorial orbit will never pass over the polar ground station. Most LEO satellites are in orbits at some inclination between equatorial and polar, and most ground stations are located at latitudes well south of the North Pole. As such, the pass frequency for any given satellite over any given ground location will typically be three to five times per day for ground stations that are not at high latitude (above about 60 degrees) and not at latitudes higher than the orbital inclination of the satellite.

The consequence of limitations on pass duration and frequency is that a satellite will be within communication range of a given ground station for no more than 10 percent of a day, and typically for less than 2 percent of the day. These constraints on pass duration and pass frequency are driven by orbital dynamics and can be overcome only by increasing the number of ground stations or locating the ground stations at very high latitudes. However, increasing the number of ground stations requires a large amount of capital investment. Furthermore, avoiding downlink constraints requires a large number of geographically diverse ground stations that are inherently underutilized.

To compensate for the limitations on ground contact time, the data transmission rate during what contact time is available is increased. High data rates in the RF require some combination of high transmitter power and high-gain antennas on the satellite and the ground station. High power transmitters and high-gain antennas on the space segment are constrained by power and mass limitations on the satellite. High-gain antennas on the ground are not mass limited, but tend to be very large (10 meters or more in diameter) and require significant capital investment.

As data produced in LEO increases substantially with more satellites launched, downlink infrastructure must grow to meet demand. However, a more fundamental limitation to downlink rates will be encountered in the future, simply due to the overuse of available RF bandwidth in the space environment. Furthermore, simply adding new RF ground terminals will not solve the problem, because the ground stations will start to interfere with one another. Similarly, RF bandwidth is constrained on the space side. For example, when two satellites are relatively close to one another, their RF signals can interfere.

For new satellite companies leveraging advances in satellite costs, capital investment for an extended ground station network is particularly burdensome because the size and cost of the ground network does not scale with the size of the satellites. Ground station costs have not scaled at the same rate as satellite costs, requiring significant investment to match growth in satellite capacity.

Laser communication has the potential to provide data rates adequate to handle all the data generated on orbit for the foreseeable future. However, current laser communication technology requires installation of expensive laser transmitters on each satellite, and places operational constraints on the satellite (pointing, jitter, etc.) that are often beyond the capability of budget satellites.

Thus, a laser communication system that can support a broad range of satellites at a moderate cost and without placing an undue burden on the satellites may be beneficial.

SUMMARY

Certain embodiments of the present invention may provide solutions to the problems and needs in the art that have not yet been fully identified, appreciated, or solved by current communication systems. For example, in some embodiments, a network of relay (or network) satellites may be employed. Each network satellite is configured to receive data from one or more client satellites, and configured to transmit data from LEO to ground using optical communications. One or more optical ground stations may be configured to receive the data and transmit the received data using terrestrial networks to client locations.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a distributed constellation of satellites in Earth orbit, called network satellites, to enhance the utility of client satellites in Earth orbit by providing a high-bandwidth data link to ground. Client satellites may include any satellite in Earth orbit that collects data at a high rate. In some embodiments, high may be defined as satellite operations that are constrained by availability of communications bandwidth, or satellite operations that require one or more dedicated ground stations. The network of satellites may receive data at close range from the client satellites, and subsequently transfer the client data to the ground using optical communication. The system may also include several widely-distributed optical ground stations for receiving data from the network satellites.

Figure 1:
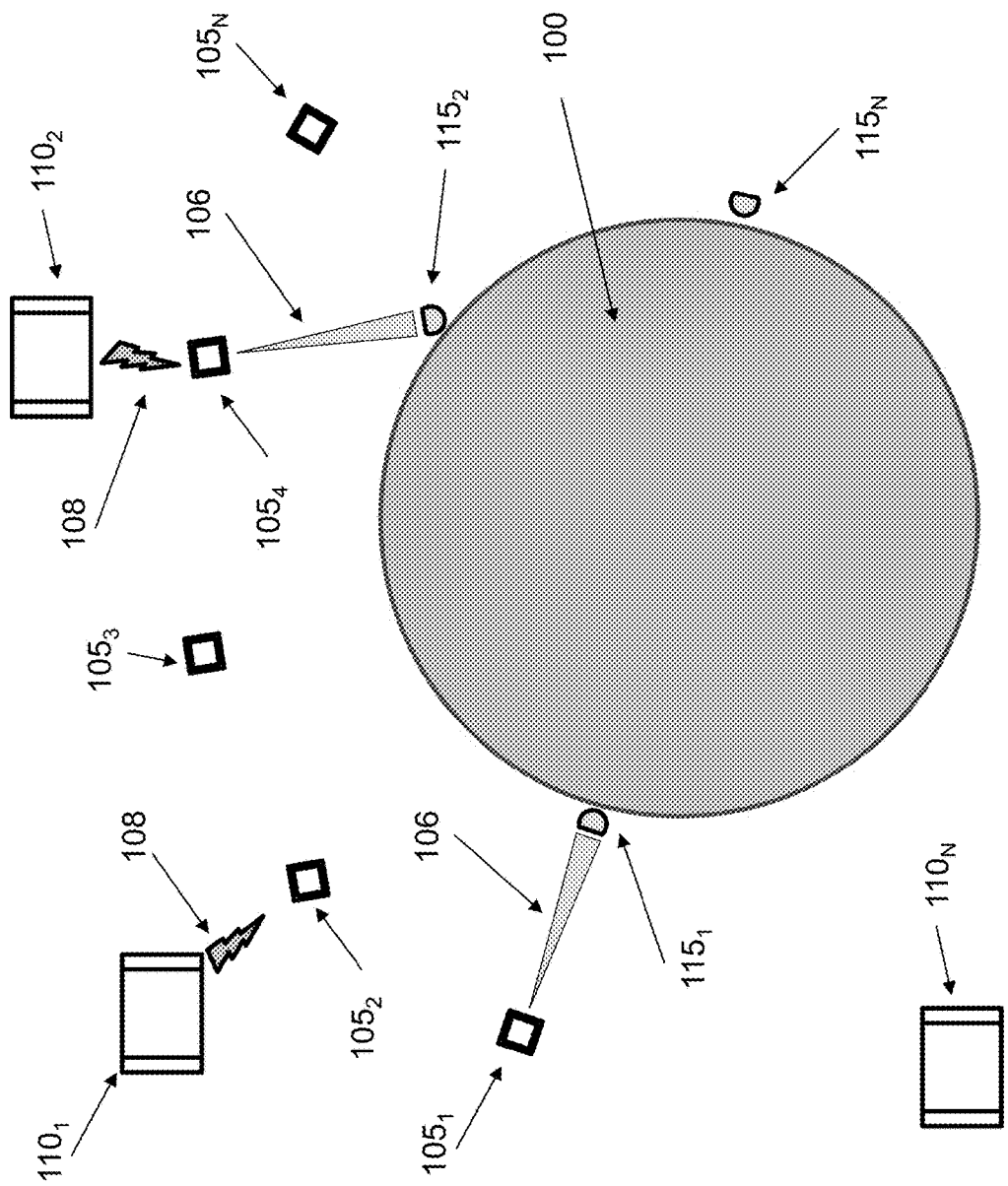
FIG. 1 illustrates an optical communication relay network, according to an embodiment of the present invention.

FIG. 1 illustrates an optical communication relay network 100, according to an embodiment of the present invention. An optical-communication relay network 100 includes an array of network satellites $105_1, 105_2 \ldots 105_N$ in earth orbit and an array of optical receiving stations on the ground. Each network satellite $105_1, 105_2 \ldots 105_N$ may include a receiver for receiving data from a client satellite $110_1, 110_2 \ldots 110_N$, memory for storing that data on board, and an optical transmitter for transmitting that data over an optical link 106 to an optical receiving station $115_1, 115_2, 115_3, \ldots, 115_N$ on the ground.

Figure 2:
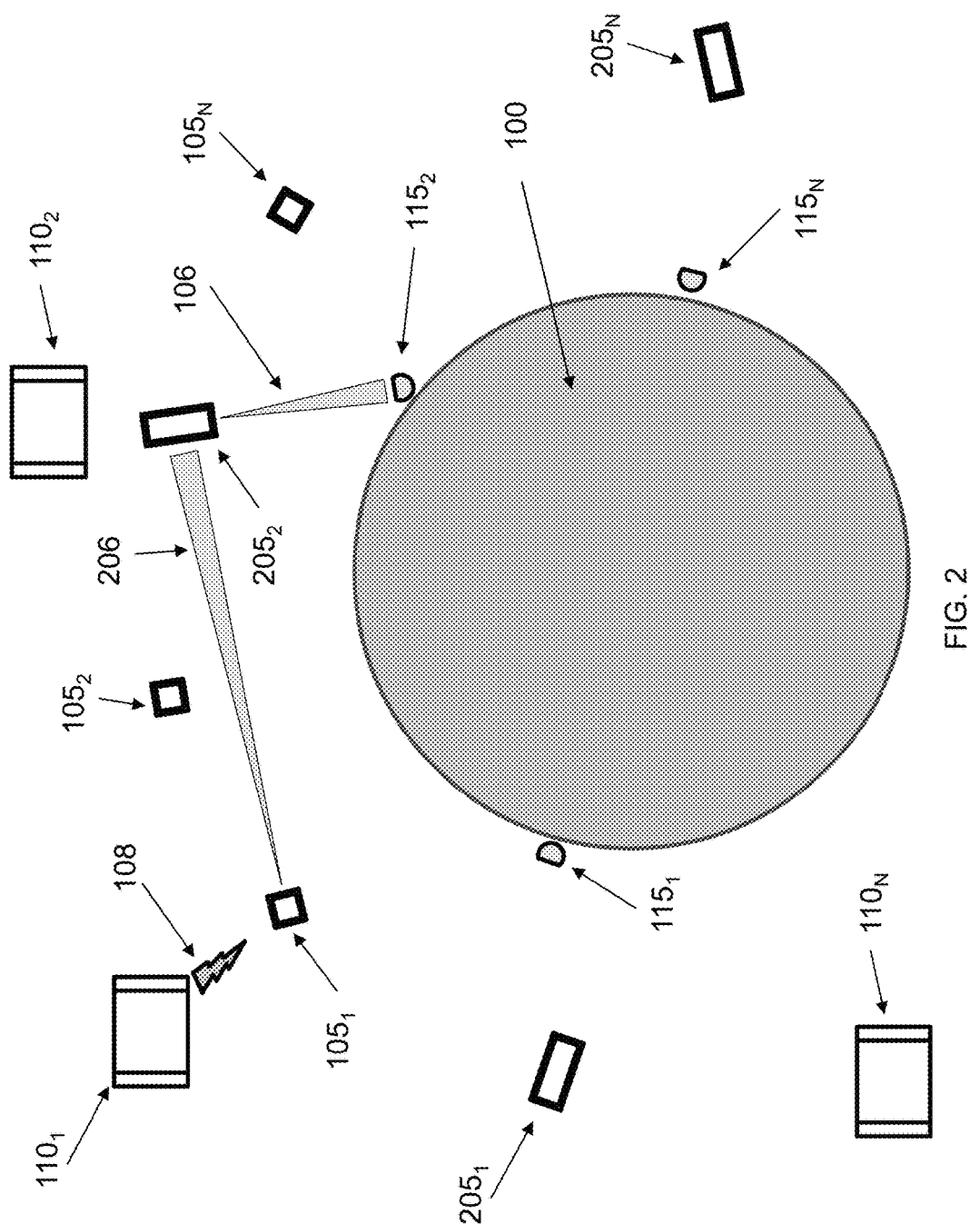
FIG. 2 illustrates an optical communication relay network with optical crosslinking, according to an embodiment of the present invention.

FIG. 2 illustrates an optical communication relay network, according to another embodiment of the present invention. An optical-communication relay network includes an array of network satellites $105_1, 105_2, \ldots, 105_N$ in earth orbit and an array of optical receiving stations $115_1, 115_2, \ldots, 115_N$ on the ground. Each network satellite $105_1, 105_2, \ldots, 105N$ may include a receiver for receiving data transmitted over a wireless link 108 from a client satellite $110_1, 110_2, \ldots, 110_N$, memory for storing that data on board, and an optical transmitter for transmitting that data over and optical link 106 to an optical receiving station $115_1, 115_2, \ldots, 115_N$ on the ground, or over an optical link 206 to another network satellite $205_1, 205_2, \ldots, 205_N$ of a second type. The second type of satellite, like the first, may include a receiver for receiving data transmitted over an optical link 206 from a network satellite $105_1, 105_2, \ldots, 105_N$ of the first type, memory for storing that data on board, and an optical transmitter for transmitting that data over and optical link 106 to an optical receiving station $115_1, 115_2, \ldots, 115_N$ on the ground.

A client satellite $110_1, 110_2 \ldots 110_N$ may be configured in some embodiment to transmit data by radio. The WorldView-3 satellite operated by Digital Globe, for example, transmits data at 1.2 Gb/s in the X-band frequency. In principle, with all of satellite's imaging capacity, the satellite can collect data at well over 1 Gb/s on a continuous basis. However, download direct to ground can occur only when the satellite is within view of a ground station. Thus, the total data collection capacity of the satellite is limited by the capacity for transferring that data to the ground.

To augment the data collection capacity of the WorldView-3 satellite, for example, a network satellite $105_1, 105_2 \ldots 105_N$ may be equipped with an X-band receiver to receive data from the client satellite $110_1, 110_2 \ldots 110_N$ whenever client satellite $110_1, 110_2 \ldots 110_N$ is within range. In this embodiment, the collected data may be stored on the network satellite $105_1, 105_2 \ldots 105_N$. When network satellite $105_1, 105_2 \ldots 105_N$ passes over an available optical ground station 115, data may be downloaded by optical ground station 115 using the laser communication system. The data would then be transferred using terrestrial networks from the optical ground station 115 to the user's destination.

It is not necessary that the data transfer rate from the client satellite to the network satellite match the data transfer rate from the network satellite to the ground. For example, the data rate used for client-to-network transfer could be the same as normally used by the client in direct transfers to the ground, while the potential data rate for network to ground transfer may be much higher over the optical link. In this case, the network satellite could accumulate data from the client over some time period and then download it to a ground station over a much shorter time period.

A network satellite in a random orbit may only occasionally be in a position to receive data from client satellite. However, by deploying a large number of relatively-inexpensive network satellites $105_1, 105_2 \ldots 105_N$, each network satellite $105_1, 105_2 \ldots 105_N$ is configured to receive data from one or more client satellites $110_1, 110_2 \ldots 110_N$. This may allow the frequency of coverage to be increased while cost is distributed over a large number of potential client satellites. At the same time, each client satellite $110_1, 110_2 \ldots 110_N$ may benefit from having regular access to any of a large number of network satellites $105_1, 105_2 \ldots 105_N$. With sufficient network satellites $105_1, 105_2 \ldots 105_N$, it would be possible for a client satellite $110_1, 110_2 \ldots 110_N$ to transmit data on a continuous basis.

Alternatively, or in addition, it may be possible to deploy network satellites $105_1, 105_2 \ldots 105_N$ in selected orbits designed to maximize their utility for a given client satellite $110_1, 110_2 \ldots 110_N$, or for a set of client satellites.

Each network satellite $105_1, 105_2 \ldots 105_N$ may include one or more RF receivers configured to receive on communications bands used by client satellites $110_1, 110_2 \ldots 110_N$. Initially, the network may be aimed at supporting existing fleets of client satellites $110_1, 110_2 \ldots 110_N$ where the client satellites $110_1, 110_2 \ldots 110_N$ are configured primarily to transmit to one or more ground stations 115. In the long run, as the capacity of the network grows and its reliability and availability become apparent in the market, new client satellites $110_1, 110_2 \ldots 110_N$ may be launched into orbit with RF transmitters optimized for short-range communication to network satellites $105_1, 105_2 \ldots 105_N$ rather than for transmission to the ground. The short-range communications can be performed at a power level substantially below that required for communications directly to ground, presenting a cost savings for satellite operators. In addition, the use of short-range communications may reduce the demand for RF bandwidth in space communications.

Each network satellite $105_1, 105_2 \ldots 105_N$ may include a laser communication transmitter configured to transmit data at rates above 100 Mb/s and preferably above 1 Gb/s.

An example laser communication system for the network satellites may be the laser system developed for AeroCube-OCSD. This laser is a 10-W Master Oscillator Fiber Amplifier (MOFA) configuration capable of encoding data at 500 Mb/s. Simple changes to the electronics and software may allow this laser to reach gigabit rates. The entire laser may be contained in a package about 10 cm square and 2.5 cm thick. The power supply (primarily in the form of batteries) occupies an additional volume of about 10 by 5 by 2 cm. As such, this laser is easily able to fit in a CubeSat form factor, and provides the necessary downlink capacity for a fleet of network satellites.

It should also be appreciated that the ground station required to receive data from this laser does not need be larger than a 30-cm optical telescope. Such telescopes may be available for the amateur-astronomy market. The drive systems produced for astronomy applications, however, are not typically adequate for precision tracking of objects in LEO, so an upgraded system may be required. Such tracking systems may be available, and may operate autonomously given the knowledge of the anticipated location of the network satellites. Such knowledge can be obtained using on-board GPS receivers on each of the network satellites.

The potential data rates that can be achieved by the network may depend on the number of satellites and the number of ground stations, in addition to the data rate of a single link. In a fully-established network, there may be a number of ground stations at distributed locations around the world. Each satellite would be able to transmit data to the ground station whenever the satellite is within view of a ground station. Because optical communication is weather-dependent, not all stations would be available for every pass. Preferably, the ground stations may be located in areas with high probability of clear skies such as desert areas or mountain tops.

A single network satellite, even operating at 1 Gb/s, may have a modest communication capacity. For example, if there is a single ground station and the single network satellite averages five minutes for each pass over the ground station, the single network satellite would be able to downlink 37 gigabytes (GB) per pass. With an average of four passes over the ground station each day, and assuming a weather factor of 80 percent (meaning the sky is clear for 80 percent of the time, on average), the single network satellite would be able to downlink on average about 120 GB per day. The overall average communication rate would be only 11 Mb/s; however, this is on a continuous basis.

The real power of the system may come through networking. For example, by increasing the number of ground stations to ten and the number of network satellites to twenty, the total download capacity reaches 24 TB/day, or 175 PB/year.

Because the network satellites can be small and simple (a 3U CubeSat would be more than adequate, and a 1U CubeSat may be sufficient), and the ground stations are far less expensive than RF ground stations with comparable data rates, the overall cost of the network can be quite modest. Because the optical signal is highly directional, multiple receiving telescopes can be co-located without interfering with one another. As the number of network satellites in orbit increases, there will be an increasing probability of two (or more) network satellites simultaneously passing over a single ground station. With multiple receiving telescopes at any ground location, each can be trained on a different passing network satellite. Because the communication channel is optical, the field of view can be quite small, well under one degree, allowing separate telescopes to track and receive data from different network satellites without interference.

In the network system described so far, the data from a client satellite is received on a network satellite and held on board until the network satellite passes over an available ground station. This enforces a delay, or latency, between collection of the data and its receipt on the ground. In some embodiments, latency may be reduced by deploying an additional constellation of network satellites of a second type. For example, type-ii satellites may have an optical receiver allowing them to receive laser communications from the type-i satellites. To reduce data latency, a type-i satellite, upon receiving urgent data from a client satellite, and not in a position to downlink the data to an available ground station, would transmit the data by laser in a cross-link to a type-ii satellite scheduled to be within range of an available ground station in a shorter time. As the number of ground stations in the network increases, this crosslinking will be needed less often. However, it could still be useful in cases where a significant number of ground stations are unavailable because of weather or other reasons. Even with a very large network of ground stations, crosslinking may continue to be useful to support customer satellites with particularly-stringent data latency requirements.

The network as a whole may be managed by an intelligent system that keeps track of the location of all network satellites, the availability of each ground station, and the data needs of the client satellites. The network manager may then assign network satellites to receive data from client satellites, schedule the downlinking of the data to the ground, and schedule crosslinking, when necessary.

The network of communication satellites described above provides many potential benefits, both to established satellite operators with existing RF downlink networks and to newer satellite operators who may not have the resources to establish their own RF downlink network.

One potential benefit may be that the network provides a communication solution to satellite operators unwilling to establish their own RF downlink network. Another benefit may be that the network provides higher data rates than are available with existing RF systems. Furthermore, the optical communication may provide improved data security because the beam diameter can be substantially smaller than comparable RF systems. In some embodiments, it may be possible to make the beam ground footprint as small as a few tens of meters. Then it would be possible to maintain ownership/control over the entire ground footprint, substantially reducing opportunities for eavesdropping.

It should also be appreciated that optical communications are less susceptible to interference and harder to jam than RF communications, and the network may provide improved redundancy through the use of multiple space and ground assets. The network may also provide reduced data latency compared to single-user systems, and provide for higher utilization of the space assets by offloading the data transmission task and reducing data storage requirements.

In a further embodiment, the network may provide for a reduced satellite power envelope by reducing transmission power requirements, and provide higher availability by having widely distributed ground systems that will limit outages due to atmospheric conditions. The network, comprised of relatively inexpensive small satellites, can be continually expanded, or even completely upgraded, to improve data rates, decrease latency, etc., at modest cost without having to modify the data-generating satellites.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A LEO satellite network for relaying data, with low latency, from one or more client satellites to one or more ground stations, said network comprising:
   a number of relay satellites deployed in a low earth orbit (LEO) relative to one or more client satellites to cause the relay satellites to pass in close proximity to the one or more client satellites,
   wherein each relay satellite includes at least
      a short range receiver configured to receive data from a client satellite when the relay satellite is in close proximity to a client satellite; and
      at least one network transceiver to cross-link with at least one other relay satellite of the network to thereby allow forwarding of client satellite data to the other relay satellite;
      wherein at least a subset of the relay satellites each further include an optical downlink transmitter configured to transmit client satellite data to one or more ground stations; and
   wherein the network transceiver operates in accordance with a crosslink scheduling assignment, which specifies which of the other relay satellites should receive a crosslink communication, and when to perform such crosslink communication.

2. The LEO satellite network of claim 1, wherein the network transceiver is repositionable to act as a downlink transmitter.

3. A LEO satellite network for relaying data, with low latency, from one or more client satellites to one or more ground stations, said network comprising:
   a number of relay satellites deployed in a low earth orbit (LEO) relative to one or more client satellites to cause the relay satellites to pass in close proximity to the one or more client satellites,
   wherein each relay satellite includes at least
      a short range receiver configured to receive data from a client satellite when the relay satellite is in close proximity to a client satellite; and
      at least one network transceiver to cross-link with at least one other relay satellite of the network to thereby allow forwarding of client satellite data to the other relay satellite;
      wherein at least a subset of the relay satellites each further include an optical downlink transmitter configured to transmit client satellite data to one or more ground stations; and
   wherein at least one of the relay satellites includes a receiver configured to receive a client satellite assignment from a network manager, which specifies which relay satellites should receive data from specified client satellites.

4. A LEO satellite network for relaying data, with low latency, from one or more client satellites to one or more ground stations, said network comprising:
   a number of relay satellites deployed in a low earth orbit (LEO) relative to one or more client satellites to cause the relay satellites to pass in close proximity to the one or more client satellites,
   wherein each relay satellite includes at least
      a short range receiver configured to receive data from a client satellite when the relay satellite is in close proximity to a client satellite; and
      at least one network transceiver to cross-link with at least one other relay satellite of the network to thereby allow forwarding of client satellite data to the other relay satellite;
      wherein at least a subset of the relay satellites each further include an optical downlink transmitter configured to transmit client satellite data to one or more ground stations; and
   wherein at least one of the relay satellites includes a receiver configured to receive a downlink scheduling assignment from a network manager, which specifies which relay satellites should transmit data to specified ground stations, and when to do so.

5. A LEO satellite network for relaying data, with low latency, from one or more client satellites to one or more ground stations, said network comprising:
   a number of relay satellites deployed in a low earth orbit (LEO) relative to one or more client satellites to cause the relay satellites to pass in close proximity to the one or more client satellites, wherein each relay satellite includes at least
- a short range receiver configured to receive data from a client satellite when the relay satellite is in close proximity to a client satellite; and
- at least one network transceiver to cross-link with at least one other relay satellite of the network to thereby allow forwarding of client satellite data to the other relay satellite;
- wherein at least a subset of the relay satellites each further include an optical downlink transmitter configured to transmit client satellite data to one or more ground stations; and a network manager, comprising:
- a memory storing orbital information for at least one client satellite and a plurality of relay satellites in the satellite network;
- a scheduler configured to determine, using the orbital information, relay satellite configuration messages; and
- a transmitter configured to transmit the relay satellite configuration messages to at least one of the plurality of relay satellites.

6. The LEO satellite network of claim 5, wherein the relay satellite configuration messages comprise downlink scheduling assignments, wherein a downlink scheduling assignment comprises a relay satellite being instructed to downlink data to a specified ground station during specified times.

7. The LEO satellite network of claim 5, wherein the relay satellite configuration messages comprise assignments of client satellites to relay satellites, wherein an assignment comprises a relay satellite of the plurality of relay satellites being instructed to receive data via a client data transceiver from at least one of the at least one client satellites.

8. The LEO satellite network of claim 5, wherein the relay satellite configuration messages comprise crosslink scheduling assignments, wherein the crosslink scheduling assignments instruct a relay satellite which other relay satellite to transmit received data to as a crosslink satellite, and wherein the crosslink scheduling assignments instruct the relay satellite when to transmit data to the crosslink satellite.

* * * * *